United States Patent [19] … Stull

[11] Patent Number: 4,625,899
[45] Date of Patent: Dec. 2, 1986

[54] HAND-HELD DISPENSER WITH AUTOMATIC VENTING

[76] Inventor: Gene Stull, 5 Oak St., Chester, N.J. 07930

[21] Appl. No.: 699,306

[22] Filed: Feb. 7, 1985

[51] Int. Cl.[4] .............................................. B67D 3/00
[52] U.S. Cl. .................................. 222/521; 222/549; 222/552; 137/859; 220/203; 220/367
[58] Field of Search ............... 222/521, 520, 188, 524, 222/525, 549, 548, 397, 481, 552; 220/205, 203, 202, 208, 209, 366, 374, 367, DIG. 27; 215/307, 309, 311, 270; 137/844, 852, 859

[56] References Cited

U.S. PATENT DOCUMENTS

| | | | |
|---|---|---|---|
| 2,423,295 | 7/1947 | Crabbe et al. | 220/366 X |
| 2,424,801 | 7/1947 | Crabbe et al. | 215/311 X |
| 2,816,682 | 12/1957 | Brucker | 220/203 |
| 3,194,453 | 7/1965 | Cherba | 222/521 |
| 3,285,479 | 11/1966 | Porter et al. | 222/521 |
| 4,007,848 | 2/1976 | Snyder | 215/307 X |
| 4,424,918 | 1/1984 | Stull | 222/521 X |

Primary Examiner—Joseph J. Rolla
Assistant Examiner—David H. Bollinger
Attorney, Agent, or Firm—H. Gibner Lehmann; K. Gibner Lehmann

[57] ABSTRACT

A hand-held dispenser for a flowable product, including a container having a neck portion at its top, and a cap body having a discharge opening and a base portion cooperable with the neck portion of the container to mount the cap body thereon. The base and neck portions have cooperable automatic pressure-relief valving structures which are responsive to increased gas pressure in the container, for venting a limited quantity of gas when the container is in its upright position, so as to prevent possible explosion of the container and spillage or splattering of its contents. In one form, there is a first annular sealing surface on one portion and a cooperable annular sealing surface on a companion portion which is engageable with the first surface when the cap body is fully seated on the neck portion. A projection on one of the portions is located adjacent the sealing surface thereof, and is engageable with the cooperable sealing surface on the other of the portions. The projection is capable of effecting a non-destructive deformation of at least one of the portions when the cap body is moved axially from the fully seated position on the neck portion. Under conditions of excess pressure, the seal between cap body and neck portion will automatically be momentarily broken or to permit venting and avoiding pressure build-up in the container. Following the venting, seal is automatically restored.

8 Claims, 12 Drawing Figures

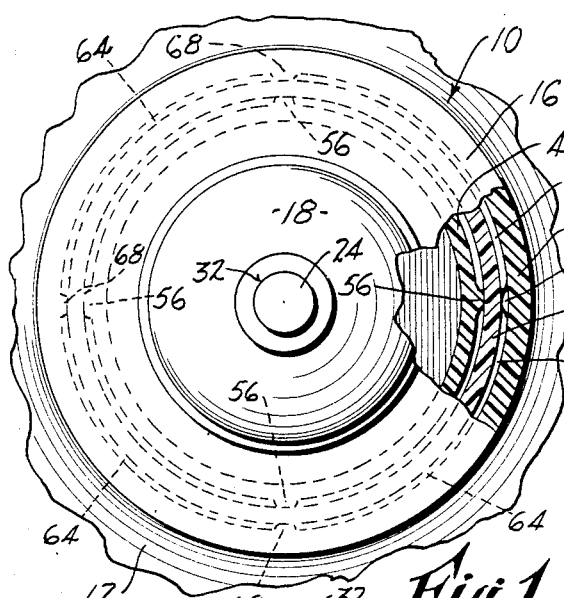
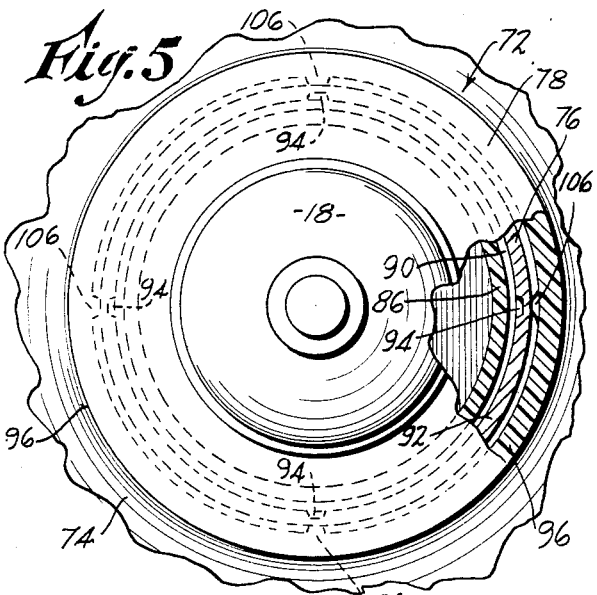
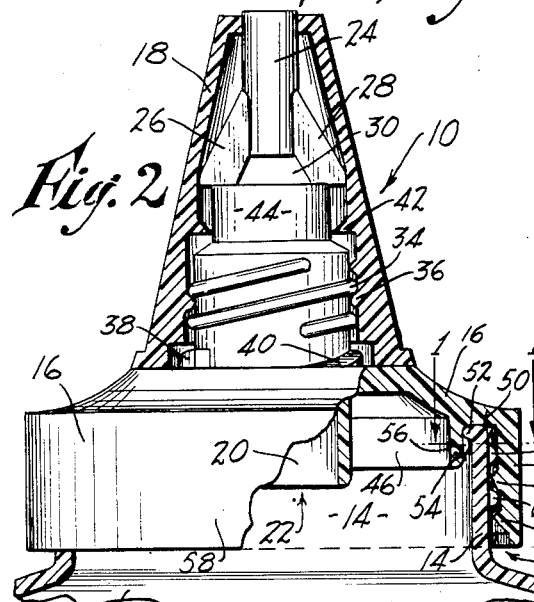
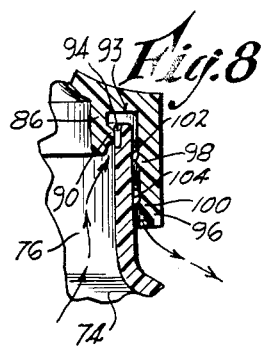
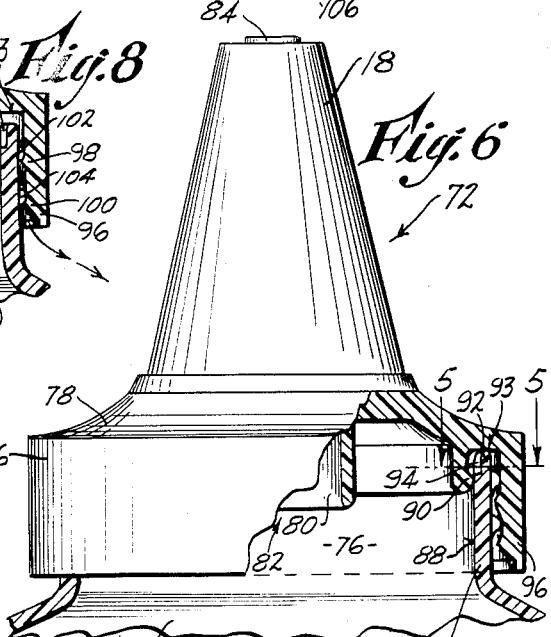
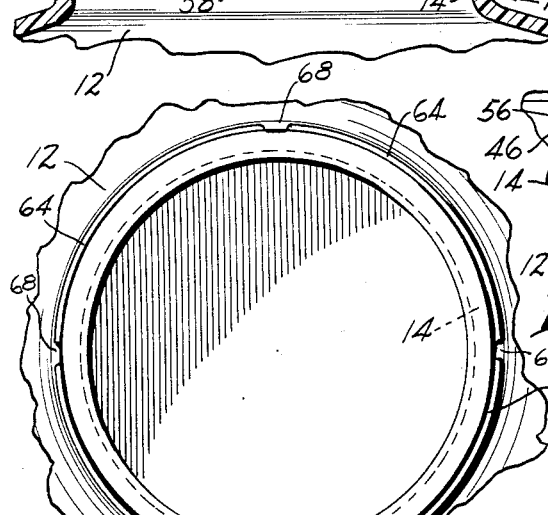
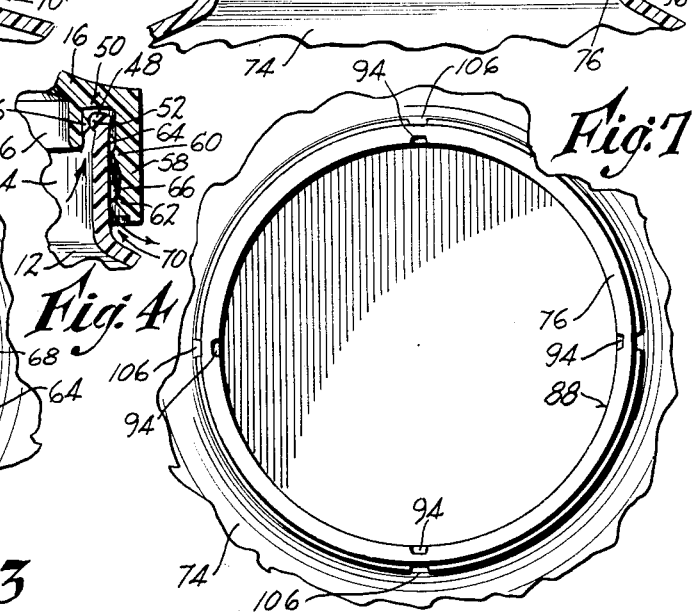

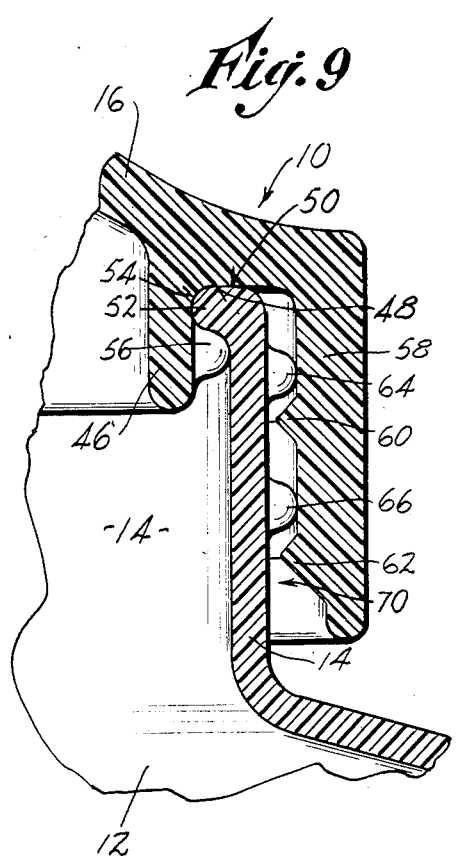
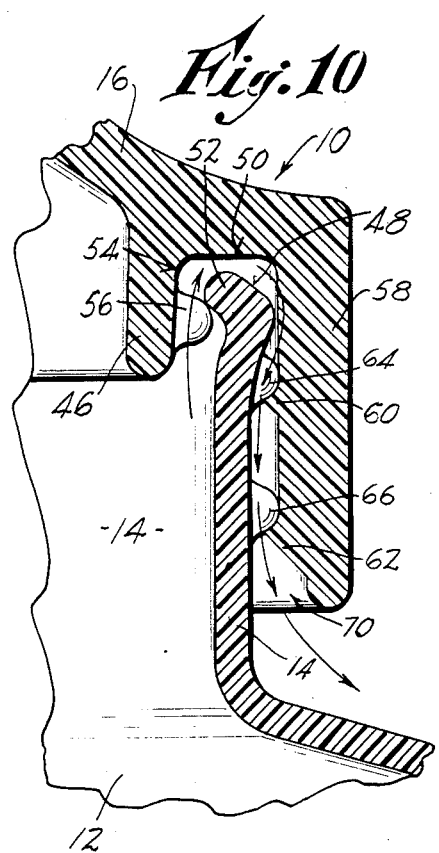
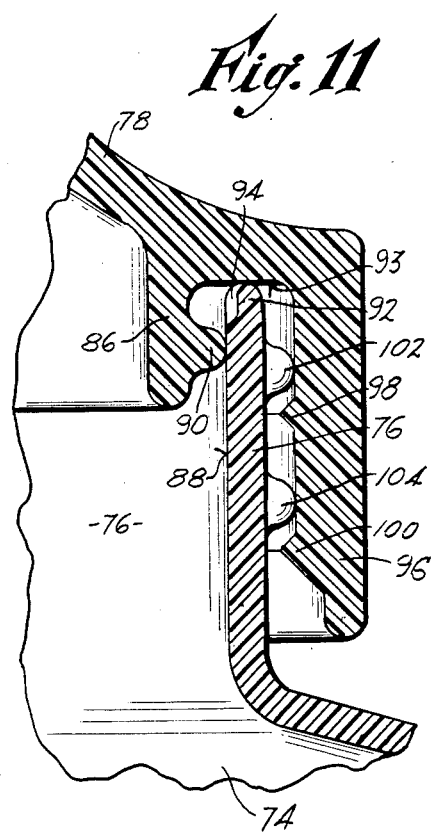
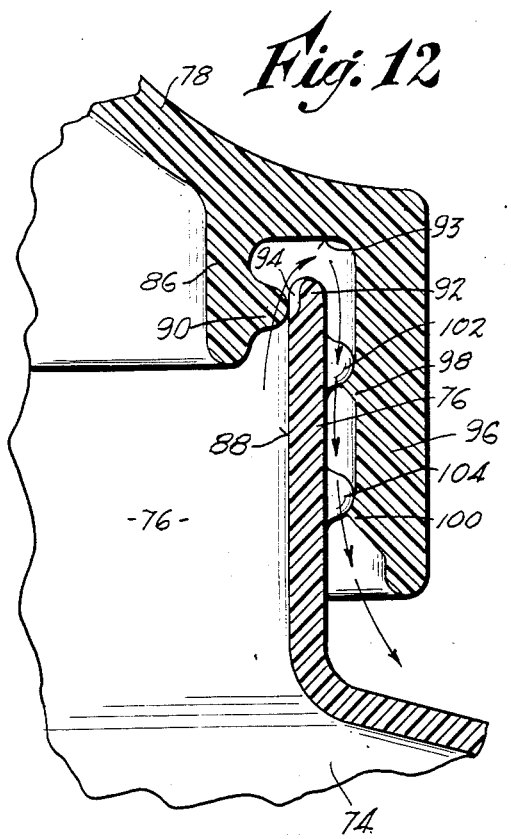

HAND-HELD DISPENSER WITH AUTOMATIC VENTING

BACKGROUND

This invention relates generally to hand-held dispensers for viscous or liquid products, and more particularly to dispensers of the type wherein a separate container having an upstanding neck is fitted with a two-part cap construction comprising a screw cap, and a base part which latter is adapted to be secured to the container neck by means of retention beads, or else alternately screwed in operative position where threads on the neck and base part are provided. In such dispensers, the base part and container normally remain together during shipping and use of the dispenser. The screw cap is held captive on the base part but is moveable thereon between sealing and discharge positions.

Dispensers of this type are well known. Examples of such dispensers are illustrated in the following patents, which are believed to constitute a representative sample of the prior art currently in existence: U. S. Pat. Nos. 3,370,764; 3,598,285; 3,406,880; 3,407,967; 3,216,630; 3,351,249; and 3,319,843, all issued to Morton B. Stull; and U. S. Pat. No. 4,477,002, issued to Gene Stull.

Dispensers of the type described and illustrated in the above patents were frequently employed with substances such as adhesives or glues of one type or another, which were for the most part, non-volatile. That is, problems associated with some of the material gasifying while still in the container were normally not encountered. Accordingly provision for dealing with build-up of excessive pressures was not made, since there was generally no necessity for doing so, and the chances of such containers bursting or breaking along a seam were minimal.

It has been found that with other types of substances, however, namely certain foods, there exists a strong tendency for gas to build up within the container after a period of time. The problem is especially troublesome with the category of foods which includes mustards. With conventional packaging where an adequate seal was employed in order to insure the integrity of the product, there have occurred instances where the container has either burst, or else the caps thereof have been blown off by the pressure in the container. In the case of mustard, such an occurrence represented not only a loss of the particular dispenser involved, but in addition, the contents often were splattered with considerable force against adjacent containers, giving rise to the need for removing them from the area where the accident occurred, cleaning them individually, and replacing them. The clean up represented an unnecessary waste of time as well as being a nuisance, as can be readily appreciated. Practically all of the containers of which I am aware do not make provision for the venting of built-up gas inside the container, since in general the manufacturers and distributors are more concerned with the integrity of the package, that is, making sure that the contents are not contaminated by external means, and also that no leakage of the product occurs during the interim between the filling of the dispenser and the purchase and use by the consumer.

SUMMARY

The above disadvantages and drawbacks of prior hand-held dispensers of the non-venting type are largely obviated by the present invention, which has for an object the provision of a novel and improved, automatically-venting hand-held dispenser which is extremely simple in its construction, while at the same time providing excellent protection against breakage or bursting of the container due to inadvertent build-up of pressure therein.

A related object of the invention is to provide an improved hand-held dispenser as above set forth, wherein the integrity of the seal between the cap portion and neck is essentially maintained under normal conditions, as where the dispenser is being stored, shipped, or used by the consumer, but which automatically and in a safe manner, momentarily relieves any pressure buildup in the container as might occur under adverse conditions, such relief being provided at a time well ahead of that which would result in explosive destruction of the container and resultant spillage or splattering the contents thereof.

Still another object of the invention is to provide an improved hand-held dispenser as above characterized, wherein the individual parts can be economically molded in relatively simple cavities, thus maintaining the overall manufacturing cost as low as possible.

Yet another object of the invention is to provide an improved hand-held dispenser of the kind indicated, wherein the assembly of the cap body onto the neck portion of the container can be readily carried out, preferably by automatic capping equipment, thus further reducing the cost of the product.

A still further object of the invention is to provide an improved hand-held dispenser as outlined above, wherein the cap body, once assembled to the neck portion, is reliably and permanently retained thereon, with virtually no possibility of the body being loosened, either inadvertently such as during handling or shipping, or deliberately, perhaps as the result of tampering.

The above objects are accomplished by the provision of a unique hand-held dispenser for a flowable product, which comprises a container having a neck portion at its top, in combination with a cap body having a discharge opening and a base portion which latter is cooperable with the neck portion to mount the cap body thereon. The base and neck portions have cooperably automatic pressure-relief valving means which is responsive to increased gas pressure in the container, for venting a limited quantity of gas when the container is in its upright position, thereby to prevent possible explosion of the container and spillage or splattering of its contents.

In one embodiment of the invention there is provided an annular sealing surface on one portion and a cooperable annular sealing surface on the other portion, engageable with the first surface when the cap body is fully seated on the neck portion. A projection on one of said portions is disposed adjacent the sealing surface thereof, and is engageable with the cooperable sealing surface on the other of the portions, so as to be capable of effecting a deformation of at least one of the portions when the cap body is raised axially from the fully seated position on the neck portion. The arrangement is such that the seal between cap body and neck portion is capable of being at least momentarily broken, thereby enabling limited venting to occur periodically and automatically, and avoiding the possibility of excessive pressure build-up in the container.

In another embodiment of the invention the valving means involves an annular sealing surface on one portion and a cooperable annular sealing surface on the other portion, which latter is sealingly engageable with the first surface when the cap body is fully seated on the neck portion. One of the portions has a recess disposed adjacent the sealing surface thereof, the recess being adapted to underlie the cooperable sealing surface on the other of the portions only when the cap body is raised axially from the fully seated position on the neck portion. During such raising movement, the seal between the said portions is broken, thereby enabling gas to pass between the one sealing surface and the walls of the recess so as to relieve pressure build-up within the container.

Other features and advantages will hereinafter appear.

In the drawings, illustrating several embodiments of the invention:

FIG. 1 is an enlarged view, partly in top plan and partly in horizontal section, of the improved automatic venting dispenser construction of the present invention. The section is taken on the line, 1—1 of FIG. 2.

FIG. 2 is a side view, partly in elevation and partly in axial section, of the venting cap and container construction of FIG. 1, illustrating details of the structure thereof.

FIG. 3 is a top plan view of the container and neck portion thereof per se, particularly showing a segmented bead disposed on the latter.

FIG. 4 is a fragmentary section of the dispenser of FIGS. 1 and 2, wherein the cap body has been raised axially upward by pressure in the container, and wherein the seal between the cooperable sealing surfaces on the base portion of the cap body and the neck portion has been momentarily broken, enabling venting of gas to occur as indicated by the arrows.

FIG. 5 is a view like that of FIG. 1, of a somewhat modified automatic venting dispenser construction constituting another embodiment of the invention.

FIG. 6 is a view like that of FIG. 2, showing certain details of the interior of the dispenser of FIG. 5.

FIG. 7 is a view like that of FIG. 3, of the container and neck portion employed with the modified venting dispenser construction of FIGS. 5 and 6.

FIG. 8 is a view like that of FIG. 4, showing the cap body of the construction of FIGS. 5-7 as having been shifted axially upward, such that a recess on the interior surface of the container neck portion underlies the sealing surface of the cap body, so as to enable venting of gas from the container interior to occur as indicated by the arrows.

FIG. 9 is a greatly enlarged fragmentary section of the construction illustrated in FIGS. 1-4, showing more particularly the details of the base portion of the cap body and the neck portion of the container.

FIG. 10 is a greatly enlarged fragmentary section of the construction of FIGS. 1-4 and 9, showing the base portion of the cap body as having been shifted axially upward with respect to the neck portion of the container by pressure therewithin, and showing arrows illustrating the direction along which gas from the interior of the dispenser is vented to the outside.

FIG. 11 is a view like that of FIG. 9, except illustrating the modified cap body and neck portion of the container shown in FIGS. 5-8.

FIG. 12 is a view like that of FIG. 10, showing the base portion of the modified cap body of FIGS. 5-8 and 11 as having been shifted axially upward with respect to the neck portion of the container by pressure therewithin, and showing arrows illustrating the direction along which gas from the interior of the dispenser is vented to the outside.

Referring first to FIG. 2 there is illustrated a cap construction generally designated by the numeral 10, adapted to be employed with a container 12 having a neck portion 14. Together, the container 12 and cap construction 10 constitute a hand-held dispenser for a flowable product. The neck portion defines a discharge passage of the container. The cap construction 10 comprises a cap body having a base portion 16 which fits onto and is held captive by the container neck portion 14, and a screw cap 18 which is turnable with respect to the base portion 16. The portion 16 has an inner depending tubular structure 20 defining the lowermost end of a discharge opening 22 that extends upwardly through the portion 16 toward a stopper plug 24 which is mounted on the remainder of the portion by means of a pair of legs 26, 28. Two opposed spaces 30 on opposite sides of the legs 26, 28 constitute openings through which product can flow. The screw cap 18 has a generally conical outer surface, with a discharge passage 32 in its transverse top wall, the passage 32 being normally closed off by the stopper plug 24. On the outer surface of the base portion 16 of the cap body are screw threads 34 adapted to mate with cooperable internal threads 36 on the screw cap 18. Two cam tracks 38, 40 are provided on the base portion, each extending circumferentially through just under 180 degrees, these being engageable by known driver lugs (not shown) on the underside of the screw cap 18. The arrangement is such that as the part 18 is unscrewed, both the threads 34, 36 and the driver lugs and cam tracks 38, 40 operate to force the cap 18 in an axially upward direction in FIG. 2. Pull-down of the screw cap 18 is effected solely by engagement of the threads 34, 36, inasmuch as the cam tracks 38, 40 are inoperative at such times.

Also, on the inner surface of the screw cap 18 is an annular sealing bead 42 that slides along a cylindrical sealing surface 44, to prevent product in the vicinity of the openings 30 from flowing into the area adjacent the threads 34, 36. Unscrewing of the screw cap 18 raises it axially, thereby removing the stopper plug 24 from the passage 32, and permitting discharge of the contents of the dispenser, all in the usual manner. The open position of the screw cap 18 is not shown in the figures.

Referring again to FIG. 2 and in accordance with the present invention there is provided a novel relief-valve means between the neck portion 14 of the container 12 and the base portion 16 of the cap body, which automatically operates to maintain the container in a sealed condition under normal conditions wherein the pressure therein is roughly equal to that existing outside the container, but to momentarily vent the container in response to build up of pressure therein, and thereafter to reestablish a seal thereof with respect to the exterior of the dispenser.

In accomplishing the above object, the base portion 16 is provided with a depending flange 46 that is adapted to be telescopically received in the neck portion 14 of the container 12 as shown in FIG. 2. FIG. 9 illustrates the depending flange 46 and neck portion 14 in greater detail. The upper surface of the neck portion 14 has in it a lip 48 that seals against the bottom disc-like surface 50 of a groove in the base portion 16. In addition, the neck portion 14 has an inner annular bead, which in the present instance is continuous, that is, essentially uninterrupted. The bead is indicated 52 and seals against the annular surface 54 on the outside of the flange 46. This annular surface is actually cylindrical in the disclosed embodiment. Disposed below the surface 54 is a projection 56; four such projections 56 are shown in FIG. 1, but a greater or lesser number would provide similar results.

In operation, when the pressure in the container is essentially the same as that outside the container, the base portion 16 occupies the position shown in FIGS. 2 and 9, that is, there exists a seal between the surfaces 52 and 54, as well as a seal between the lip 48 and surface 50. The projections 56 do not interfere with either seal, and the integrity of the dispenser is maintained, assuming that the screw cap 18 is disposed in its closed, sealing position as shown in FIG. 2. In the event that gaseous components of the contents of the container cause pressure to begin to build up within the dispenser, as has been found to occur with certain substances, namely mustards, an axially upwardly-directed force will be applied to the base portion 16; if the force becomes sufficiently great, the portion 16 will shift upwardly, most likely at one side of the container. When this occurs, at least one of the projections 56 will be applied against the bead 52, and the seal between the surface 54 and bead 52 will at least momentarily be broken, enabling the excess pressure to vent past the bead 52, past the surface 48, and in a downward direction past the outer surface of the container neck portion 14. As soon as sufficient gas has been expelled to equalize the pressures, the projections 56 will restore the base portion 16 to its normal position wherein there again exists a seal between the surface 54 and bead 52, as well as between the surfaces 48 and 50. The resilience of the plastic material of which the container neck portion 14 and base portion 16 are formed restores the original positioning of the parts.

In the figures it can be seen that the base portion 16 has an outer wall, indicated 58. The inner surface of the outer wall 58 has two annular beads 60, 62, which are cooperable with similar beads 64, 66 on the outer surface of the neck portion 14. The purpose of the beads 60, 62 and 64, 66 is to provide a positive retention of the base portion 16 on the container 12 at all times, regardless of the pressure conditions existing in the latter. FIG. 1 shows that the beads 64, 66 are not continuous; instead, they preferably consist of four arcuate sectors or segments, each extending essentially through 90 degrees and each being separated from the adjacent arcuate sector by a small space or notch. The notches are indicated 68, FIG. 1, and they operate to provide vent openings for the gas that is passing downwardly outside of the neck portion 14 when venting is occurring. Even in the case that the beads 62, 66 and 60, 64 engage one another, there would still be venting space available for the escape of the gas, due to the space indicated 70 which always exists between the innermost portion or diameter of the beads 60, 62 and the outer surface of the neck portion 14. Such a circumstance where the beads engage is shown, somewhat exaggerated, in FIG. 10. In some of the appended claims, the position of the base portion 16 with respect to the container neck portion 14 corresponding to the showing of FIG. 9 is referred to as a fully-seated position, and the position of FIG. 10 referred to as an axially-shifted or raised position of the base portion 16 with respect to the neck portion 14.

During venting, the gas will follow a path generally along that indicated by the arrows in FIG. 10.

Stated in general terms the invention which is set forth above involves the provision of engageable annular sealing surfaces 52, 54 which are in sealing engagement with one another in the absence of excess internal pressure in the container 12, but which become displaced from one another by the establishment of pressure sufficient to shift the base portion 16 of the cap body axially upward, such that discontinuities or interruptions in the seal surfaces, taking the form of projections 56 that engage the bead 52, break or crack the seal between parts 52 and 54, at least momentarily. As an alternate construction (not shown), a continuous bead similar to that indicated 52 could be incorporated on the outer surface of the flange 46, and projections similar to those labelled 56 formed on the inner surface of the neck portion 14, at the location of the existing bead 52. The seal would be established in an analogous manner, and the momentary breaking of the seal would occur as the base portion 16 is shifted axially upward in FIGS. 2 and 9.

Another embodiment of the invention is illustrated in FIGS. 5-8 and 11-12. The structure of the screw cap 18 is essentially the same as that of the first embodiment. The dispenser is indicated by the numeral 72; the modified container 74 is provided with a neck portion 76. The base portion 78 of the cap body has an inner depending flange 80 defining a discharge opening 82 which communicates with the area around the stopper plug 84 in FIG. 6. In addition, the base portion 78 has a depending cylindrical flange 86 which is telescopically received in the neck portion 76 as illustrated in FIG. 11.

Referring again to FIG. 6 and in accordance with the present invention there is provided a novel relief-valve means between the neck portion 76 of the container 74 and the base portion 78 of the cap body, which automatically operates to maintain the container in a sealed condition under normal conditions wherein the pressure therein is roughly equal to that existing outside the container, but to momentarily vent the container in response to build-up of pressure therein, and thereafter reestablish the seal between the sealing surfaces of the container neck portion and base portion of the cap body.

In accomplishing the above object, the invention provides an annular sealing surface 88 on the interior of the neck portion 76, that is adapted for engagement with a cooperable surface formed by an external bead 90 on the outside of the flange 86 when the base portion 78 occupies a fully seated position on the neck portion 76 as shown in FIG. 11. In addition to the seal between surfaces 88 and 90, the lip 92 of the neck portion seals with the disc-like surface 93 at the base of the groove in the base portion 78. The bead 90 in the present instance is preferably continuous, that is, extends through 360 degrees and is uninterrupted. On the inner surface of the neck portion 76 there is provided a relief or recess indicated 94, there being four such recesses disposed about the periphery of the neck portion 76. These recesses are also shown in FIG. 7, and constitute by-pass passages, as will be explained below.

In operation, with normal pressures in the container there is essentially no upwardly directed force applied to the base portion 78 from within the container, and the integrity of the seal between the surfaces 88 and 90 is maintained. However, if sufficient pressure builds within the container, so as to force the base portion 78 upwardly in the figures, generally one side will be shifted first. As this occurs, the bead 90 is brought to a position wherein one of the recesses 94 underlies the bead 90, and the seal between it and the sealing surface 88 is, at least momentarily, broken. At the same time, the seal between the lip 92 and the bottom surface 93 of the groove is disturbed so that gas from the interior of the container can by-pass the bead 90 by flowing through one or more recesses 94, over the lip 92, and downwardly past the outside of the neck portion 76. The general direction of this flow is indicated by the arrows in FIG. 12.

As in the previous construction, additional retainer structures are provided on the outer surface of the neck portion 76 and on the outer wall 96. The inner surface of the outer wall 96 has two annular beads 98, 100 which are cooperable with similar beads 102, 104, respectively on the outer surface of the neck portion 76. The beads 98, 100 and 102, 104 provide positive retention of the base portion 78 on the container 74 at all times, which is significant because unlike the prior arrangement, little retention of the base portion 78 by the neck portion 76 is provided by the engagement of the bead surface 90 and surface 88. FIG. 5 shows that the beads 102, 104 are not continuous, but instead preferably consist of four arcuate sectors or segments, each extending through 90 degrees, and each being separated from the adjacent arcuate sector by a small space or notch. The notches are indicated 106, and they operate to provide vent openings for the gas that is passing downwardly outside of the neck portion 76 when such venting is occurring. If the beads 100, 104 and 98 and 102 engage one another during venting, there is still maintained the capability for the escape of gas, due to the spaces indicated 106 which always exists between the innermost portion or diameter of the beads 98, 100 and the outer surface of the neck portion 76.

While in the embodiment of FIGS. 1-4 and 9-10 there occurs deformation of the wall constituting the neck portion 14 of the container, in the embodiment of FIGS. 5-8 and 11-12 little or no deformation occurs at the location of the sealing surfaces 88, 90. The nature of the difference in function can be readily determined by a comparison of FIGS. 10 and 12, respectively.

From the above it can be seen that I have provided novel and improved, automatically-venting, hand-held dispensers that are both simple in their structure, and that effectively solve the problem of pressure build-up in the container without sacrificing the integrity of the seal between the base portion of the cap body and the container itself. The parts can be economically molded and thereafter assembled with automatic capping equipment, all to the end of minimizing overall manufacturing and assembly cost.

The dispensers are thus seen to represent a distinct advance and improvement in this field.

Each and every one of the appended claims defines an aspect of the invention which is separate and distinct from all others, and accordingly each claim is to be treated in this manner when examined in the light of the prior art devices in any determination of novelty or validity.

Variations and modifications are possible without departing from the spirit of the invention.

What is claimed is:

1. An automatically venting cap construction for a dispenser, comprising in combination:
   (a) a cap body having an annular sealing surface,
   (b) a container having a discharge passage closeable by the cap body,
   (c) said discharge passage having a cooperable annular sealing surface sealingly engageable with the sealing surface of the cap body,
   (d) means defining a projection adjacent one of said surfaces and engageable with the other of said surfaces when the body is raised axially from its sealing position on the discharge passage, such that the projection separates the one sealing surface from the other and at least momentarily breaks the seal therebetween so as to vent gaseous components of the contents of the container when the latter is in an upright position.

2. An automatically venting cap construction for a dispenser, comprising in combination:
   (a) a cap body having an annular sealing surface,
   (b) a container having a discharge passage closeable by the cap body,
   (c) said discharge passage having a cooperable annular sealing surface sealingly engageable with the sealing surface of the cap body, and
   (d) means defining a recess adjacent one of said sealing surfaces, adapted to underlie the other of said sealing surfaces only when the cap body is raised axially from its sealing position on the discharge passage, such that the said recess provides a by-pass passage around the said other sealing surface and at least monentarily breaks the seal therebetween so as to vent gaseous components of the contents of the container when the latter is in an upright position.

3. A hand-held dispenser for a flowable product, comprising in combination:
   (a) a container for said product, having a neck portion at its top,
   (b) a cap body having a discharge opening, and having a base portion cooperable with the neck portion of the container to mount the cap body thereon,
   (c) said base portion and neck portion having cooperable, automatic pressure-relief valving means responsive to increased gas pressure in the container, for venting a quantity of said gas when the container is in its upright position, and
   (d) cooperable means on the container neck portion and cap body base portion, for enabling limited axial movement of the latter on the neck portion, said means also effecting a permanent retention of the base portion against complete removal from the said neck portion and providing for free passage of vented gas therebetween,
   (e) said valving means comprising an annular sealing surface on one of said portions, and a cooperable annular sealing surface on the other of said portions, engageable with the sealing surface on said one portion when the cap body is fully seated on the container neck portion, and
   (f) means defining a recess disposed in one of said portions adjacent the sealing surface thereof, said recess underlying the cooperable sealing surface on the other of said portions when the cap body is raised axially from the said fully seated position on the container neck portion, such that the seal between the said portions is broken, thereby enabling said venting to occur.

4. The invention as set forth in claim 3, wherein:
   (a) said cap body has a depending skirt adapted to telescopically fit into the opening of the container neck portion, said skirt having an outer surface, and said container neck portion having an inner surface, and having a lip, (b) one of said annular sealing surfaces comprising a bead on the outer surface of the said skirt, (c) the other of said annular sealing surfaces comprising a substantially cylindrical area on the inner surface of the container neck portion, (d) said recess being disposed adjacent the lip of the container neck portion and located on the inner surface thereof, such that when the cap body is raised from the fully seated position on the container neck portion, the recess underlies the said bead and creates an opening constituting the vent for the container.

5. The invention as set forth in claim 4, and further including:

(a) means defining three additional recesses in said one portion, said additional recesses being disposed adjacent the sealing surface thereof, said additonal recesses underlying the cooperable sealing surface on the other of said portions when the cap body is raised axially from the said fully seated position on the container neck portion.

6. A hand-held dispenser for a flowable product, comprising in combination:

(a) a container for said product, having a neck portion at its top, (b) a cap body having a discharge opening, and having a base portion cooperable with the neck portion of the container to mount the cap body thereon, (c) said base portion and neck portion having cooperable, automatic pressure-relief valving means responsive to increased gas pressure in the container, for venting a quantity of said gas when the container is in its upright position, (d) said valving means comprising an annular sealing surface on one of said portions, and a cooperable annular sealing surface on the other of said portions, engageable with the sealing surface on said one portion when the cap body is fully seated on the container neck portion, and (e) a projection disposed on one of said portions adjacent the sealing surface thereof, said projection being engageable with the cooperable sealing surface on the other of said portions and effecting a deformation of at least one of said portions when the cap body is raised axially from the said fully seated position on the neck portion, such that the seal between said portions is broken, thereby enabling said venting to occur.

7. The invention as set forth in claim 6, wherein:

(a) said cap body has a depending skirt adapted to telescopically fit into the opening of the container neck portion, said skirt having an outer surface, (b) one of said annular sealing surfaces comprising a substantially cylindrical area on the said outer surface of the said skirt, (c) said container neck portion having an inner surface and the other of said annular sealing surfaces comprising a bead on the inner surface of the neck portion, sealingly engageable with said cylindrical area, (d) said projection being located on the outer surface of the said skirt below the said one annular sealing surface, such that when the cap body is raised from the fully seated position on the container neck portion, the projection engages the said bead and deforms at least one of the sealing surfaces, thereby creating an opening constituting the vent for the container.

8. The invention as set forth in claim 7, and further including:

(a) three additional projections on said one portion and disposed adjacent the sealing surface thereof, said additional projections being engageable with the cooperable sealing surface on the other of said portions and effecting a deformation of at least one of said portions when the cap body is raised axially from the said fully seated position on the neck portion.

* * * * *